United States Patent
Tsai et al.

(10) Patent No.: US 10,875,023 B2
(45) Date of Patent: Dec. 29, 2020

(54) ORIENTED LOADING SYSTEMS AND METHOD FOR ORIENTING A PARTICLE LOADED IN A WELL

(71) Applicant: PERSONAL GENOMICS, INC., Grand Cayman (KY)

(72) Inventors: Ching-Wei Tsai, Taoyuan (TW);
Hsin-Yi Hsieh, Taoyuan (TW);
Yu-Hsuan Peng, New Taipei (TW);
Wen-Yih Chen, Taoyuan (TW);
Chun-Jen Huang, Changhua (TW)

(73) Assignee: PERSONAL GENOMICS, INC., Grand Cayman (KY)

( * ) Notice: Subject to any disclaimer, the term of this patent is extended or adjusted under 35 U.S.C. 154(b) by 371 days.

(21) Appl. No.: 14/989,228

(22) Filed: Jan. 6, 2016

(65) Prior Publication Data
US 2016/0193602 A1    Jul. 7, 2016

Related U.S. Application Data (60) Provisional application No. 62/100,715, filed on Jan. 7, 2015.

(51) Int. Cl.
*B01L 3/00* (2006.01)
*G01N 1/28* (2006.01)

(52) U.S. Cl.
CPC ....... *B01L 3/5085* (2013.01); *B01L 3/502761* (2013.01); *G01N 1/2813* (2013.01);
(Continued)

(58) Field of Classification Search
CPC .................................... B01L 3/00; G01N 1/28
(Continued)

(56) References Cited

U.S. PATENT DOCUMENTS 4,272,510 A  *  6/1981  Smith ................... B03C 1/0332
                                              427/127
4,895,650 A  *  1/1990  Wang ........................ B01L 9/06
                                              210/222

(Continued)

FOREIGN PATENT DOCUMENTS

EP           1 903 337 A1    3/2008
JP        2000-292426    * 10/2000 ........... G01N 33/543
(Continued)

OTHER PUBLICATIONS

Anker, J. N. et al, Applied Physics Letters, 2003, 82, 1102-1104.*
(Continued)

*Primary Examiner* — Arlen Soderquist
(74) *Attorney, Agent, or Firm* — Birch, Stewart, Kolasch & Birch, LLP (57) ABSTRACT

An oriented loading system is provided. The oriented loading system includes a substrate, a plurality of wells formed in the substrate, each well having a bottom and sidewalls, a plurality of particles loaded in the wells, wherein the particle comprises a core structure and an inner layer comprising magnetic material partially covering the core structure such that a part of the core structure uncovered by the inner layer is exposed, and a metal layer comprising magnetic material deposited partially in the sidewalls of the wells, wherein the inner layer is attracted by the metal layer such that the exposed core structure is oriented towards the bottom of the well or the inner layer is oriented towards the bottom of the well.

11 Claims, 10 Drawing Sheets

(52) U.S. Cl.
CPC .......................... *B01J 2219/005* (2013.01); *B01J 2219/00317* (2013.01); *B01J 2219/00468* (2013.01); *B01L 2200/025* (2013.01); *B01L 2200/0647* (2013.01); *B01L 2200/0663* (2013.01); *B01L 2200/0668* (2013.01); *B01L 2300/0809* (2013.01); *B01L 2300/0829* (2013.01); *B01L 2300/0858* (2013.01); *B01L 2300/0887* (2013.01); *B01L 2400/043* (2013.01)

(58) Field of Classification Search
USPC ............................................ 436/174
See application file for complete search history.

(56) References Cited

U.S. PATENT DOCUMENTS

| | | | | |
|---|---|---|---|---|
| 4,988,618 | A * | 1/1991 | Li | B03C 1/288 210/222 |
| 5,655,665 | A * | 8/1997 | Allen | B03C 1/035 209/223.1 |
| 5,705,062 | A * | 1/1998 | Knobel | G01N 33/54326 210/205 |
| 5,779,907 | A * | 7/1998 | Yu | B01L 3/5085 210/222 |
| 5,922,617 | A | 7/1999 | Wang et al. | |
| 6,429,027 | B1 * | 8/2002 | Chee | G01N 33/543 435/283.1 |
| 6,514,416 | B1 * | 2/2003 | Harradine | B03C 1/288 210/222 |
| 6,776,174 | B2 * | 8/2004 | Nisson | B01L 3/5085 134/104.4 |
| 7,285,412 | B2 * | 10/2007 | Casagrande | B01L 3/5085 435/177 |
| 7,316,899 | B2 * | 1/2008 | McDevitt | B01L 3/0289 435/6.19 |
| 7,998,746 | B2 * | 8/2011 | Otillar | B01J 19/0046 436/151 |
| 8,277,628 | B2 * | 10/2012 | Ronaghi | B01L 3/502761 204/400 |
| 8,361,316 | B2 * | 1/2013 | Siddiqi | B01F 13/0809 209/217 |
| 8,658,042 | B2 * | 2/2014 | Fasching | B01L 9/523 210/222 |
| 8,735,172 | B2 * | 5/2014 | Leblans | B01J 19/0046 436/518 |
| 8,906,831 | B2 * | 12/2014 | Eid | G01N 33/54313 506/16 |
| 9,128,044 | B2 * | 9/2015 | Fife | G01N 27/414 |
| 9,153,300 | B2 * | 10/2015 | Otillar | B01J 19/0046 |
| 9,725,758 | B2 * | 8/2017 | Zengerle | C12Q 1/6837 |
| 2002/0048534 | A1 * | 4/2002 | Storek | B03C 1/035 506/39 |
| 2003/0012693 | A1 * | 1/2003 | Otillar | G01N 27/745 506/39 |
| 2003/0022370 | A1 * | 1/2003 | Casagrande | B01L 3/5085 435/372.1 |
| 2003/0087455 | A1 | 5/2003 | Eggers et al. | |
| 2004/0069857 | A1 * | 4/2004 | Leblans | B01J 19/0046 235/494 |
| 2004/0166577 | A1 * | 8/2004 | Storek | B01J 19/0093 435/287.2 |
| 2010/0081215 | A1 * | 4/2010 | De Geest | G01N 33/54326 436/518 |
| 2012/0015844 | A1 * | 1/2012 | Zengerle | C12Q 1/6837 506/9 |
| 2012/0172260 | A1 * | 7/2012 | Otillar | G01N 27/745 506/39 |
| 2012/0202709 | A1 * | 8/2012 | Bergo | C40B 30/10 506/12 |
| 2012/0288852 | A1 * | 11/2012 | Willson | G01N 15/10 435/5 |
| 2014/0323330 | A1 * | 10/2014 | Bergo | G01N 33/54306 506/9 |
| 2015/0119274 | A1 * | 4/2015 | Piletsky | B01L 3/5085 506/9 |
| 2016/0282255 | A1 * | 9/2016 | Irimia | G01N 33/54326 |

FOREIGN PATENT DOCUMENTS

| | | |
|---|---|---|
| JP | 2002-181819 A | 6/2002 |
| KR | 10-2011-0075549 A | 7/2011 |
| WO | WO 2012/102329 A1 | 8/2012 |
| WO | WO 2013/179069 A1 | 12/2013 |

OTHER PUBLICATIONS

Derveaux, S. et al, Langmuir 2007, 23, 10272-10279.*
Australian Office Action for Appl. No. 2016200047 dated Oct. 25, 2016.
European Search Report for Appl. No. 16150313.1 dated May 19, 2016.
Chinese Office Action dated Dec. 5, 2017 for CN Application No. 2016/10009299.6.

* cited by examiner

ORIENTED LOADING SYSTEMS AND METHOD FOR ORIENTING A PARTICLE LOADED IN A WELL

CROSS REFERENCE TO RELATED APPLICATIONS

This application claims the benefit of U.S. Provisional Application No. 62/100,715, filed 7 Jan. 2015, the entirety of which is incorporated by reference herein.

TECHNICAL FIELD

The technical field relates to an oriented loading system and a method for orienting a particle loaded in a well.

BACKGROUND

Most conventional chemical or biochemical assays are based on "bulk" measurements. In such measurements, the collective behavior of a plurality of molecules within a certain volume of a sample solution is measured to determine the properties of the molecules. However, in many situations, the bulk measurement approach cannot be utilized, such as when the sample volume is too small or the concentration of a target molecule is too low for a given technique's limit of sensitivity in detecting target molecules. In recent years, the detection of single target molecules has become possible. Also, single-molecule detection offers much higher sensitivity and provides more detailed information than conventional bulk measurements. The development of single-molecule instrument sensitivity also promises new opportunities for high-sensitivity biological molecule detection and diagnosis.

In the field of single molecule detection, some difficulties occur in loading the target molecules into a reaction/observation region and formation of target molecule aggregation.

Therefore, development of improved systems and methods for enhancing loading efficiency of target molecules and explicitly detecting signals produced therefrom is desirable.

SUMMARY

Embodiments described herein provide systems and methods for oriented loading particles into wells via electrostatic force, magnetic force or the combination thereof. In accordance with one embodiment of the disclosure, an oriented loading system is provided. The oriented loading system comprises a substrate; a plurality of wells formed in the substrate, each well having a bottom and sidewalls; a plurality of particles loaded in the wells, wherein the particle comprises a core structure, an inner layer comprising iron, cobalt, nickel or an alloy thereof (i.e. magnetic material) partially covering the core structure and an outer layer formed over the inner layer such that a part of the core structure uncovered by the inner layer and the outer layer is exposed; and a metal layer comprising iron, cobalt, nickel or an alloy thereof (i.e. magnetic material) deposited partially in the sidewalls of the wells corresponding to the inner layer, wherein the inner layer is attracted by the metal layer such that the exposed core structure is oriented towards the bottom of the well or the outer layer is oriented towards the bottom of the well. In some embodiments, the metal layer has the same material as the inner layer. Optionally, the exposed core structure is modified by negatively charged molecules thereon and the bottom of the wells is modified by positively charged molecules thereon such that the exposed core structure is oriented towards the bottom of the well, or the outer layer is modified by negatively charged molecules thereon and the bottom of the wells is modified by positively charged molecules thereon such that the outer layer is oriented towards the bottom of the well. In some embodiments, the outer layer is optional. In some embodiments, the exposed core structure is covered by a coating layer.

In accordance with one embodiment of the disclosure, an oriented loading system is provided. The oriented loading system comprises a substrate; a plurality of wells formed in the substrate, each well having a bottom and sidewalls, wherein the bottom of the wells is modified by positively charged molecules thereon; and a plurality of particles loaded in the wells, wherein the particle comprises a core structure, optionally an inner layer comprising iron, cobalt, nickel or an alloy thereof (i.e. magnetic material) partially covering the core structure, and an outer layer formed over the inner layer or directly over the core structure such that a part of the core structure uncovered by the inner layer and the outer layer is exposed, wherein the exposed core structure is modified by negatively charged molecules thereon or the outer layer is modified by negatively charged molecules thereon such that the exposed core structure is oriented towards the bottom of the well or the outer layer is oriented towards the bottom of the well.

In accordance with one embodiment of the disclosure, an oriented loading system is provided. The oriented loading system comprises a substrate; a plurality of wells formed in the substrate, each well having a bottom and sidewalls; a plurality of particles with magnetic beads loaded in the wells; and a metal layer comprising magnetic material deposited in the sidewalls of the wells corresponding to the magnetic beads, wherein the magnetic bead is attracted by the metal layer such that the magnetic bead is oriented towards the bottom of the well. In some embodiments the metal layer has the same material as the magnetic beads. Optionally, the magnetic bead is modified by negatively charged molecules thereon and the bottom of the wells is modified by positively charged molecules thereon such that the magnetic bead is oriented towards the bottom of the well.

In accordance with one embodiment of the disclosure, an oriented loading system is provided. The oriented loading system comprises a substrate; a plurality of wells formed in the substrate, each well having a bottom and sidewalls, wherein the bottom of the wells is modified by positively charged molecules or negatively charged molecules thereon; and a plurality of particles loaded in the wells, wherein the particle comprises a core structure, an inner layer comprising iron, cobalt, nickel or an alloy thereof (i.e. magnetic material) partially covering the core structure and an outer layer modified by neutrally charged molecules thereon formed over the inner layer such that a part of the core structure uncovered by the inner layer and the outer layer is exposed, wherein the exposed core structure is modified by negatively charged molecules or positively charged molecules thereon such that the exposed core structure is oriented towards the bottom of the well.

In accordance with one embodiment of the disclosure, a method for orienting a particle loaded in a well is provided. The method for orienting a particle loaded in a well comprises providing a substrate having a plurality of wells formed therein, each well having a bottom and sidewalls, wherein a metal layer comprising magnetic material is deposited in the sidewalls of the wells; providing a plurality of particles, wherein the particle comprises a core structure, an inner layer comprising iron, cobalt, nickel or an alloy thereof (i.e. magnetic material) partially covering the core structure and an outer layer formed over the inner layer such that a part of the core structure uncovered by the inner layer and the outer layer is exposed; and loading the particles in the wells, wherein the inner layer is attracted by the metal layer such that the exposed core structure is oriented towards the bottom of the well or the outer layer is oriented towards the bottom of the well. In some embodiments, the metal layer has the same material as the inner layer.

In accordance with one embodiment of the disclosure, a method for orienting a particle loaded in a well is provided. The method for orienting a particle loaded in a well comprises providing a substrate having a plurality of wells formed therein, each well having a bottom and sidewalls, wherein a metal layer comprising magnetic material is deposited in the sidewalls of the wells; providing a plurality of particles, wherein the particle comprises a core structure, an inner layer comprising iron, cobalt, nickel or an alloy thereof (i.e. magnetic material) partially covering the core structure and an outer layer formed over the inner layer such that a part of the core structure uncovered by the inner layer and the outer layer is exposed; and loading the particles in the wells, wherein the inner layer is attracted by the metal layer. The method further comprises modifying the exposed core structure by negatively charged molecules thereon and modifying the bottom of the wells by positively charged molecules thereon such that the exposed core structure is oriented towards the bottom of the well, or modifying the outer layer by negatively charged molecules thereon and modifying the bottom of the wells by positively charged molecules thereon such that the outer layer is oriented towards the bottom of the well. In some embodiments, the metal layer has the same material as the inner layer.

In accordance with one embodiment of the disclosure, a method for orienting a particle loaded in a well is provided. The method for orienting a particle loaded in a well comprises providing a substrate having a plurality of wells formed therein, each well having a bottom and sidewalls, wherein the bottom of the wells is modified by positively charged molecules thereon; providing a plurality of particles, wherein the particle comprises a core structure, an inner layer comprising iron, cobalt, nickel or an alloy thereof (i.e. magnetic material) partially covering the core structure and an outer layer formed over the inner layer such that a part of the core structure uncovered by the inner layer and the outer layer is exposed, wherein the exposed core structure is modified by negatively charged molecules thereon or the outer layer is modified by negatively charged molecules thereon; and loading the particles in the wells such that the exposed core structure is oriented towards the bottom of the well or the outer layer is oriented towards the bottom of the well.

In accordance with one embodiment of the disclosure, a method for orienting a particle loaded in a well is provided. The method for orienting a particle loaded in a well comprises providing a substrate having a plurality of wells formed therein, each well having a bottom and sidewalls, wherein the bottom of the wells is modified by zwitterionic molecules thereon; providing a plurality of particles, wherein the particle comprises a core structure and an outer layer partially covering the core structure such that a part of the core structure uncovered by the outer layer is exposed, wherein the exposed core structure or the outer layer is modified by electrically charged molecules thereon; loading the particles with a solution in the wells; and modulating pH value of the solution such that the zwitterionic molecules comprise electrical charges which are opposite to or the same as the electrically charged molecules on the exposed core structure or the outer layer, wherein the exposed core structure or the outer layer is attracted by or repelled by the zwitterionic molecules on the bottom of the wells and therefore the exposed core structure or the outer layer is oriented towards the bottom of the well or the particle moves away from the well.

In the disclosure, the nanoparticles enhance loading efficiency of target molecules. Signals produced from the target molecules are explicitly detected due to precise orientation of the nanoparticles during detection. The target molecules are combined onto the nanoparticle and the signals produced from the target molecules are improved by controlling the side connected with the target molecules of the particle towards detector/sensor. The present disclosure provides the methods and systems for precise nanoparticle orientation via modifying the nanoparticles, the nanowells or combination thereof.

A detailed description is given in the following embodiments with reference to the accompanying drawings.

BRIEF DESCRIPTION OF THE DRAWINGS

The disclosure can be more fully understood by reading the subsequent detailed description and examples with references made to the accompanying drawings, wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are shown schematically in order to simplify the drawing.

Figure 1:
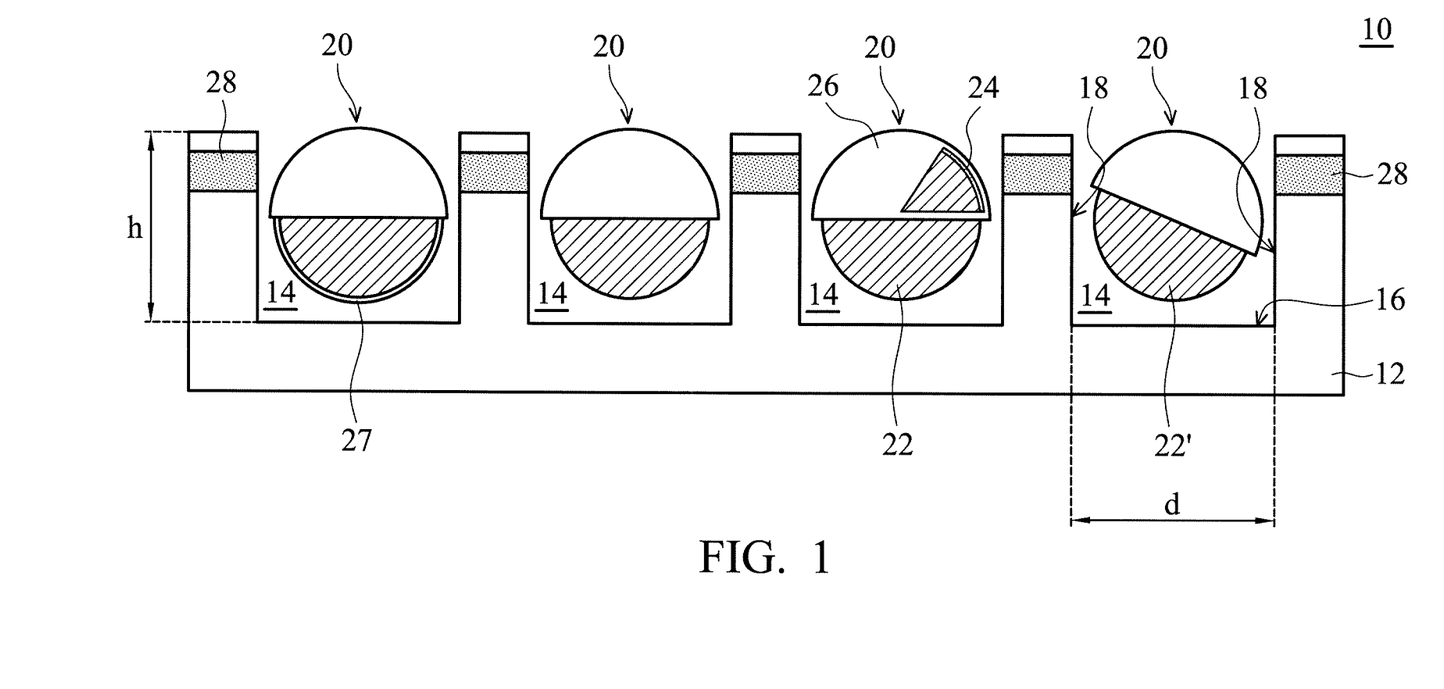
FIG. 1 is a cross-sectional view of an oriented loading system in accordance with one embodiment of the disclosure.

Referring to FIG. 1, in accordance with one embodiment of the disclosure, an oriented loading system 10 is provided. The oriented loading system 10 comprises a substrate 12, a plurality of wells 14 formed in the substrate 12, each well 14 having a bottom 16 and sidewalls 18, a plurality of particles 20 loaded in the wells 14. The particle 20 (e.g. a Janus particle) comprises a core structure 22, an inner layer 24 comprising magnetic materials such as iron, cobalt, nickel or an alloy thereof partially covering the core structure 22 and an outer layer 26 formed over the inner layer 24 such that a part of the core structure 22 uncovered by the inner layer 24 and the outer layer 26 is exposed, and a metal layer 28 comprising magnetic materials such as iron, cobalt, nickel or an alloy thereof deposited partially in the sidewalls 18 of the wells 14 corresponding to the inner layer 24. The inner layer 24 is attracted by the metal layer 28 such that the exposed core structure 22' is oriented towards the bottom 16 of the well 14. Optionally, the metal layer 28 has the same material as the inner layer 24.

In this embodiment, the metal layer 28 is deposited in the upper part of the sidewalls 18 such that the exposed core structure 22' is oriented towards the bottom 16 of the well 14. For example, the metal layer 28 is deposited in the position of the sidewalls 18 which is above ½, ⅔ or ¾ of the well depth.

In some embodiments, the substrate 12 above the metal layer 28 may comprise non-magnetic materials, for example, silicon, gold, chromium, silver, silica, alumina, $TiO_2$ or $Ta_2O_5$.

In some embodiments, the metal layer 28 has a thickness which is about 0.1-0.3 times the diameter of the particle 20.

In some embodiments, the core structure 22 may comprise non-magnetic materials, for example, polymers such as polystyrene or hydrogel, metal oxides such as silica or alumina, metals such as gold, silver or copper or an alloy thereof, or diamond.

In some embodiments, the outer layer 26 may comprise non-magnetic materials, for example, polystyrene, hydrogel, silica, alumina, diamond, or gold, silver, copper or an alloy thereof.

In some embodiments, the inner layer 24 has a thickness of about 5 nm to about 1,000 nm. Optionally, the inner layer 24 has a thickness of about 10 nm to about 100 nm.

In some embodiments, the outer layer 26 has a thickness of about 5 nm to about 1,000 nm. Optionally, the outer layer 26 has a thickness of about 10 nm to about 100 nm.

In some embodiments, the outer layer 26 may be optional.

In some embodiments, about one-third to two-thirds of the surface of the core structure 22 is covered by the inner layer 24 and the outer layer 26.

In some embodiments, the particle 20 has a diameter of about 50 nm to about 10,000 nm (10 m) or about 100 nm to about 10,000 nm (10 μm).

In some embodiments, the particle 20 may further comprise a coating layer 27 formed over the exposed core structure 22'. The coating layer may comprise non-magnetic materials such as polystyrene, hydrogel, silica, alumina, diamond, or gold, silver, copper or an alloy thereof which is different from the outer layer 26.

In some embodiments, the well 14 has a width d which is about 1-3 times the diameter of the particle 20.

In some embodiments, the well 14 has a depth h which is about 0.1-5 times the diameter of the particle 20.

Figure 2:
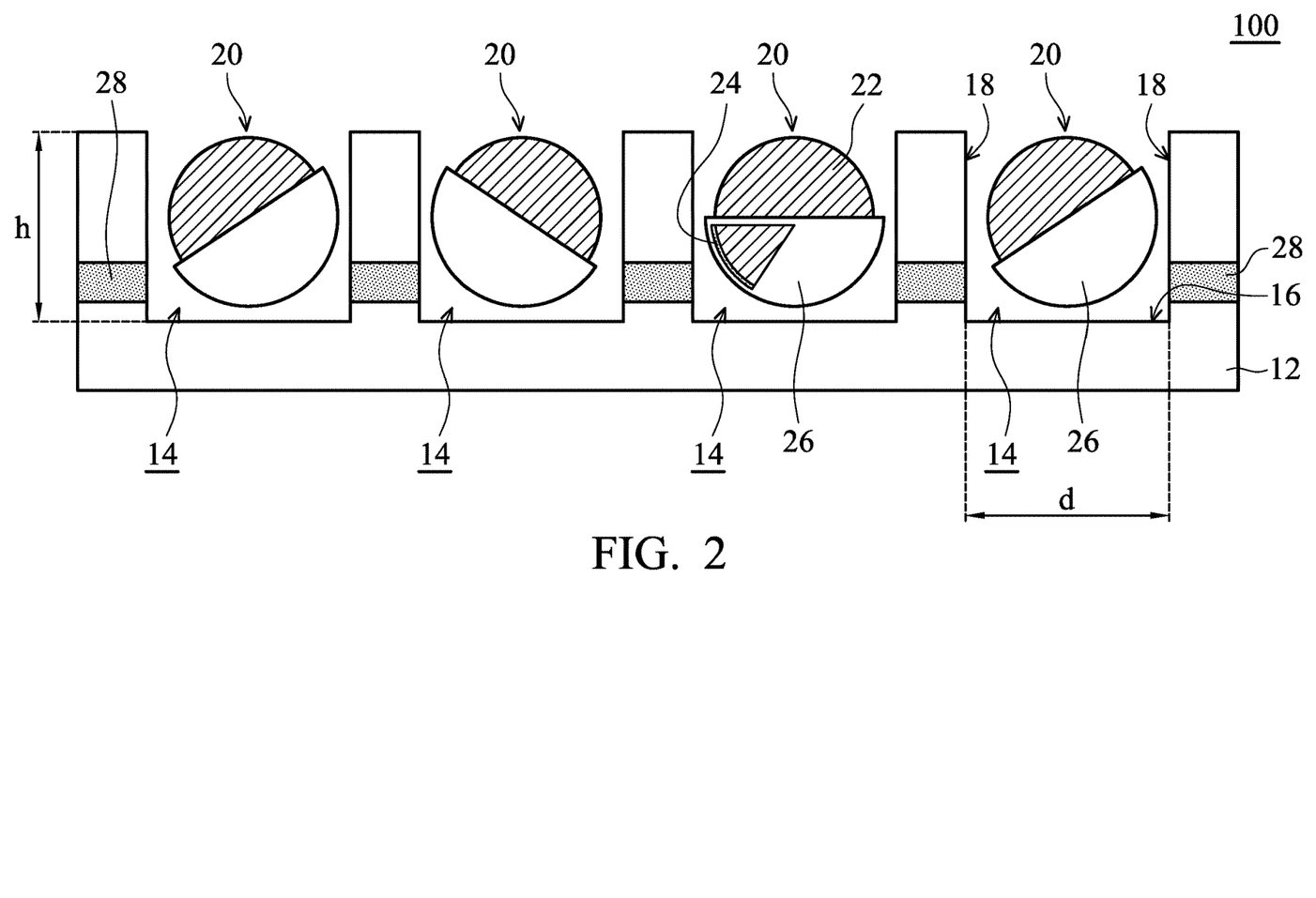
FIG. 2 is a cross-sectional view of an oriented loading system in accordance with one embodiment of the disclosure.

Referring to FIG. 2, in accordance with one embodiment of the disclosure, an oriented loading system 100 is provided. The oriented loading system 100 comprises a substrate 12, a plurality of wells 14 formed in the substrate 12, each well 14 having a bottom 16 and sidewalls 18, a plurality of particles 20 loaded in the wells 14. The particle 20 (e.g. a Janus particle) comprises a core structure 22, an inner layer 24 comprising magnetic materials such as iron, cobalt, nickel or an alloy thereof partially covering the core structure 22 and an outer layer 26 formed over the inner layer 24 such that a part of the core structure 22 uncovered by the inner layer 24 and the outer layer 26 is exposed, and a metal layer 28 comprising magnetic materials such as iron, cobalt, nickel or an alloy thereof deposited partially in the sidewalls 18 of the wells 14 corresponding to the inner layer 24. The inner layer 24 is attracted by the metal layer 28 such that the outer layer 26 is oriented towards the bottom 16 of the well 14. Optionally, the metal layer 28 has the same material as the inner layer 24.

In this embodiment, the metal layer 28 is deposited in the lower part of the sidewalls 18 such that the outer layer 26 is oriented towards the bottom 16 of the well 14. For example, the metal layer 28 is deposited in the position of the sidewalls 18 which is below ½, ⅓ or ¼ of the well depth.

In some embodiments, the outer layer 26 may be optional.

Figure 3A:
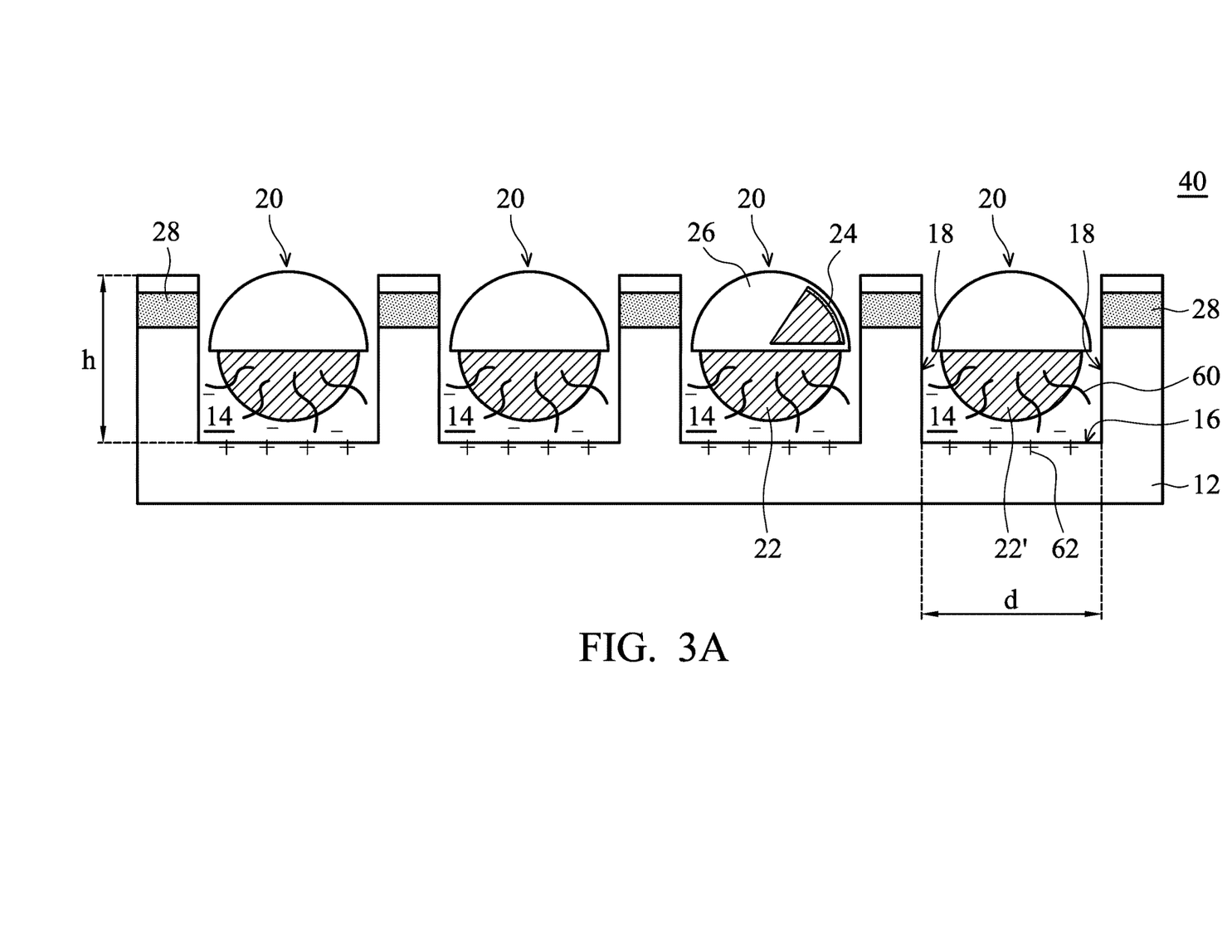
FIG. 3A is a cross-sectional view of an oriented loading system in accordance with one embodiment of the disclosure.

Referring to FIG. 3A, in accordance with one embodiment of the disclosure, an oriented loading system 40 is provided. The oriented loading system 40 comprises a substrate 12, a plurality of wells 14 formed in the substrate 12, each well 14 having a bottom 16 and sidewalls 18, a plurality of particles 20 loaded in the wells 14. The particle 20 (e.g. a Janus particle) comprises a core structure 22, an inner layer 24 comprising magnetic materials such as iron, cobalt, nickel or an alloy thereof partially covering the core structure 22 and an outer layer 26 formed over the inner layer 24 such that a part of the core structure 22 uncovered by the inner layer 24 and the outer layer 26 is exposed, and a metal layer 28 comprising magnetic materials such as iron, cobalt, nickel or an alloy thereof deposited partially in the sidewalls 18 of the wells 14 corresponding to the inner layer 24. The inner layer 24 is attracted by the metal layer 28 such that the exposed core structure 22' is oriented towards the bottom 16 of the well 14. Optionally, the metal layer 28 has the same material as the inner layer 24.

In this embodiment, the metal layer 28 is deposited in the upper part of the sidewalls 18 such that the exposed core structure 22' is oriented towards the bottom 16 of the well 14.

In some embodiments, the outer layer 26 may be optional.

Additionally, the exposed core structure 22' and the bottom 16 of the wells 14 are modified by electrically charged molecules thereon, for example, the exposed core structure 22' is modified by negatively charged molecules 60 thereon, and the bottom 16 of the wells 14 is modified by positively charged molecules 62 thereon. Specifically, the electrically charged molecules on the exposed core structure 22' comprise opposite charge to the electrically charged molecules on the bottom 16 of the wells 14 such that the exposed core structure 22' is oriented towards the bottom 16 of the well 14.

In some embodiments, the electrically charged molecules on the exposed core structure 22' may be a target molecule such as polynucleotide or other molecules such as proteins, viruses, bacteria, cells, negatively charged polymers or negatively charged particles.

In some embodiments, the electrically charged molecules on the bottom 16 of the wells 14 may comprise a zwitterionic molecule such as cysteine-betaine (CB) silane pI=5-6) through pH modulation (for example pH<pI).

Figure 3B:
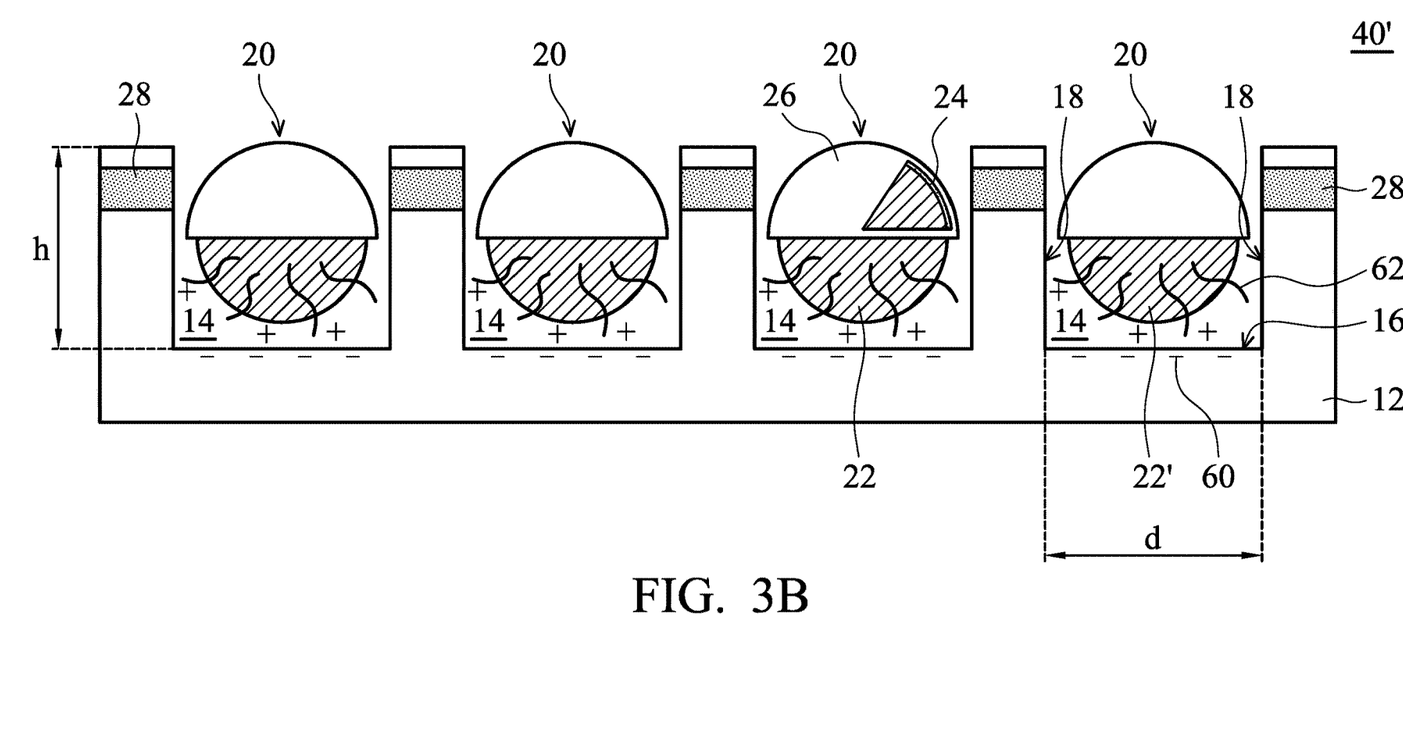
FIG. 3B is a cross-sectional view of an oriented loading system in accordance with one embodiment of the disclosure.

Referring to FIG. 3B, in accordance with one embodiment of the disclosure, an oriented loading system 40' is provided. The distinction between the oriented loading system 40 of FIG. 3A and the oriented loading system 40' of FIG. 3B is that, in the oriented loading system 40', the exposed core structure 22' is modified by positively charged molecules 62 thereon, and the bottom 16 of the wells 14 is modified by negatively charged molecules 60 thereon.

Figure 4A:
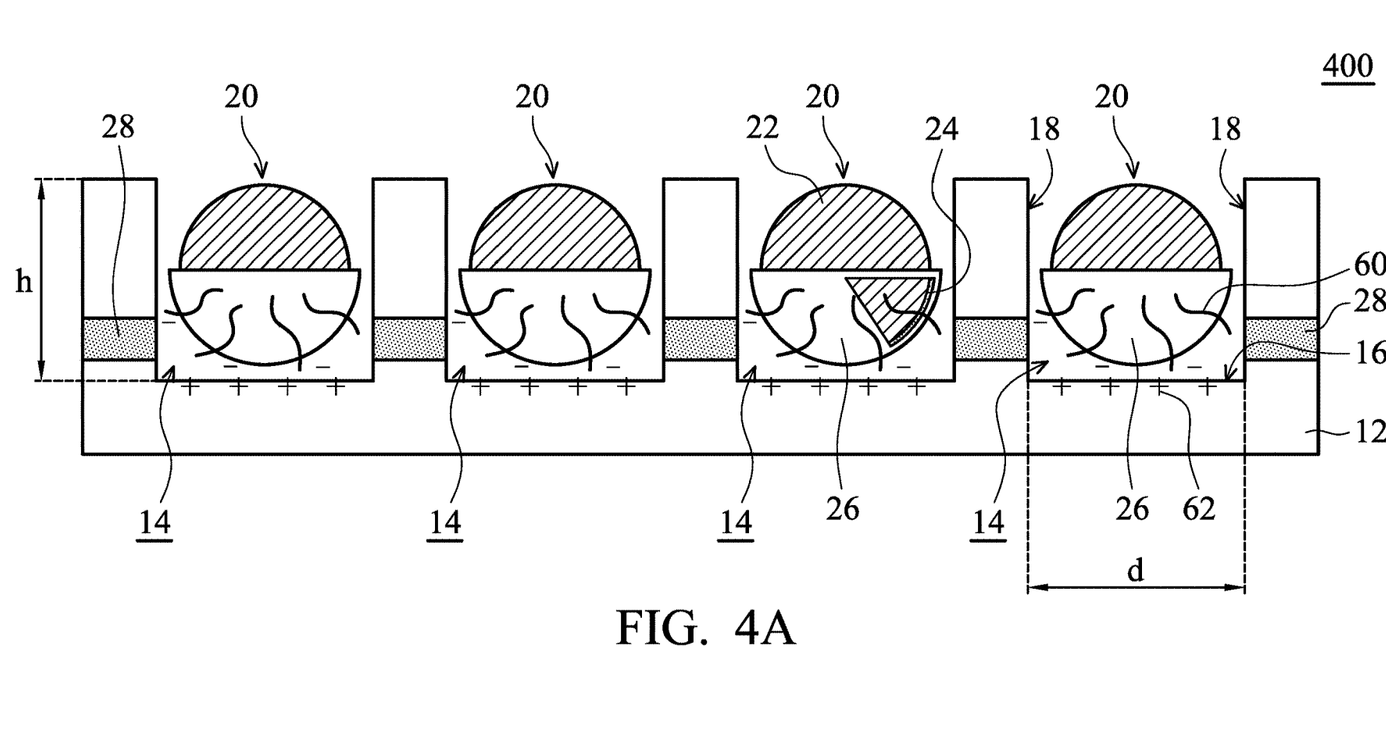
FIG. 4A is a cross-sectional view of an oriented loading system in accordance with one embodiment of the disclosure.

Referring to FIG. 4A, in accordance with one embodiment of the disclosure, an oriented loading system 400 is provided. The oriented loading system 400 comprises a substrate 12, a plurality of wells 14 formed in the substrate 12, each well 14 having a bottom 16 and sidewalls 18, a plurality of particles 20 loaded in the wells 14. The particle 20 (e.g. a Janus particle) comprises a core structure 22, an inner layer 24 comprising magnetic materials such as iron, cobalt, nickel or an alloy thereof partially covering the core structure 22 and an outer layer 26 formed over the inner layer 24 such that a part of the core structure 22 uncovered by the inner layer 24 and the outer layer 26 is exposed, and a metal layer 28 comprising magnetic materials such as iron, cobalt, nickel or an alloy thereof deposited partially in the sidewalls 18 of the wells 14 corresponding to the inner layer 24. The inner layer 24 is attracted by the metal layer 28 such that the outer layer 26 is oriented towards the bottom 16 of the well 14. Optionally, the metal layer 28 has the same material as the inner layer 24.

In this embodiment, the metal layer 28 is deposited in the lower part of the sidewalls 18 such that the outer layer 26 is oriented towards the bottom 16 of the well 14.

Additionally, the outer layer 26 and the bottom 16 of the wells 14 are modified by electrically charged molecules thereon, for example, the outer layer 26 is modified by negatively charged molecules 60 thereon, and the bottom 16 of the wells 14 is modified by positively charged molecules 62 thereon. Specifically, the electrically charged molecules on the outer layer 26 comprise opposite charge to the electrically charged molecules on the bottom 16 of the wells 14 such that the outer layer 26 is oriented towards the bottom 16 of the well 14.

In some embodiments, the electrically charged molecules on the outer layer 26 may be a target molecule such as polynucleotide or other molecules such as proteins, viruses, bacteria, cells, negatively charged polymers or negatively charged particles.

In some embodiments, the electrically charged molecules on the bottom 16 of the wells 14 may comprise a zwitterionic molecule such as cysteine-betaine (CB) silane pI=5-6) through pH modulation (for example pH<pI).

In some embodiments, the outer layer 26 may be optional.

In some embodiments, when the outer layer 26 is optional, the electrically charged molecules are modified on the inner layer 24.

Figure 4B:
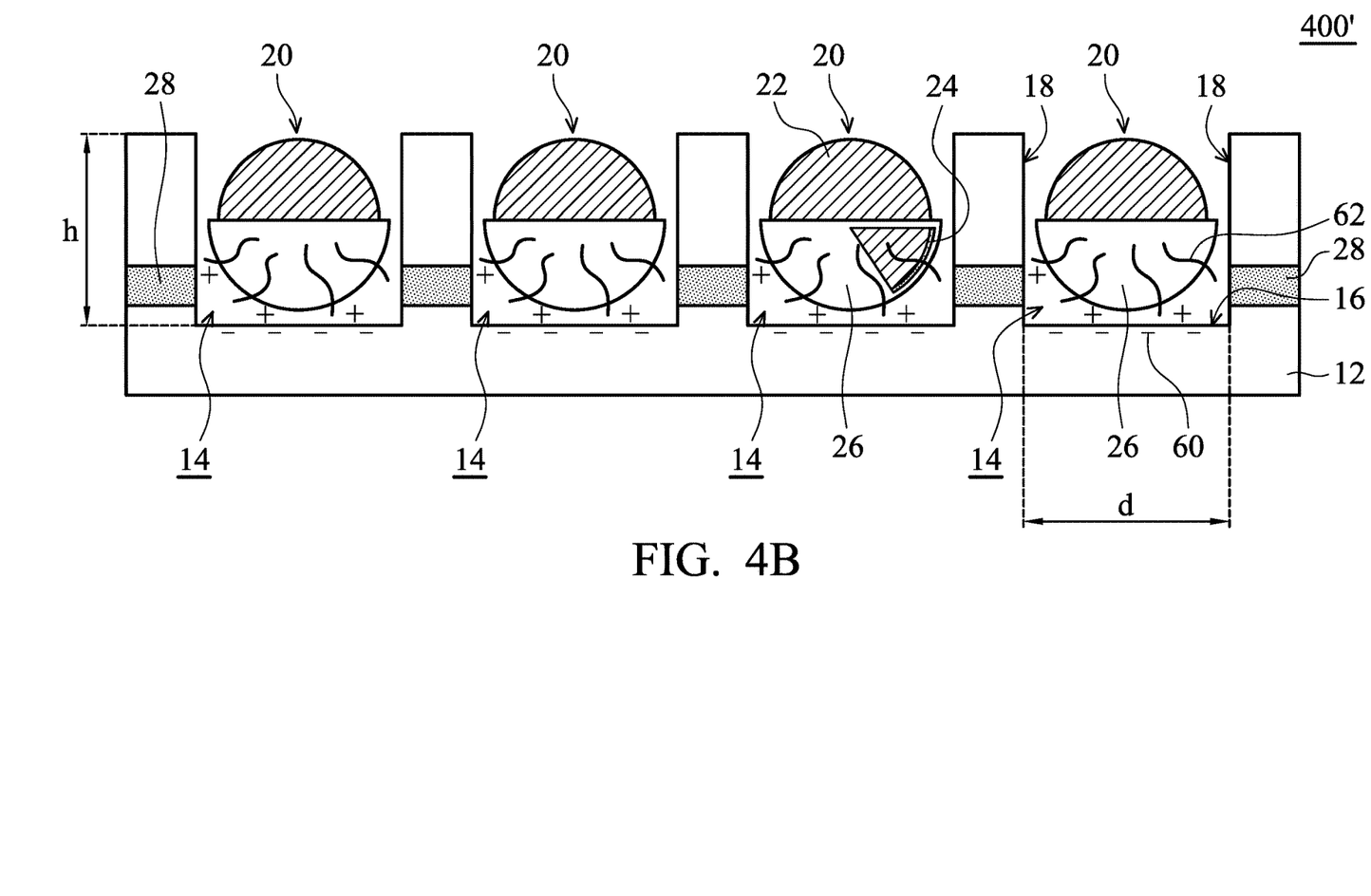
FIG. 4B is a cross-sectional view of an oriented loading system in accordance with one embodiment of the disclosure.

Referring to FIG. 4B, in accordance with one embodiment of the disclosure, an oriented loading system 400' is provided. The distinction between the oriented loading system 400 of FIG. 4A and the oriented loading system 400' of FIG. 4B is that, in the oriented loading system 400', the outer layer 26 is modified by positively charged molecules 62 thereon, and the bottom 16 of the wells 14 is modified by negatively charged molecules 60 thereon.

Figure 5:
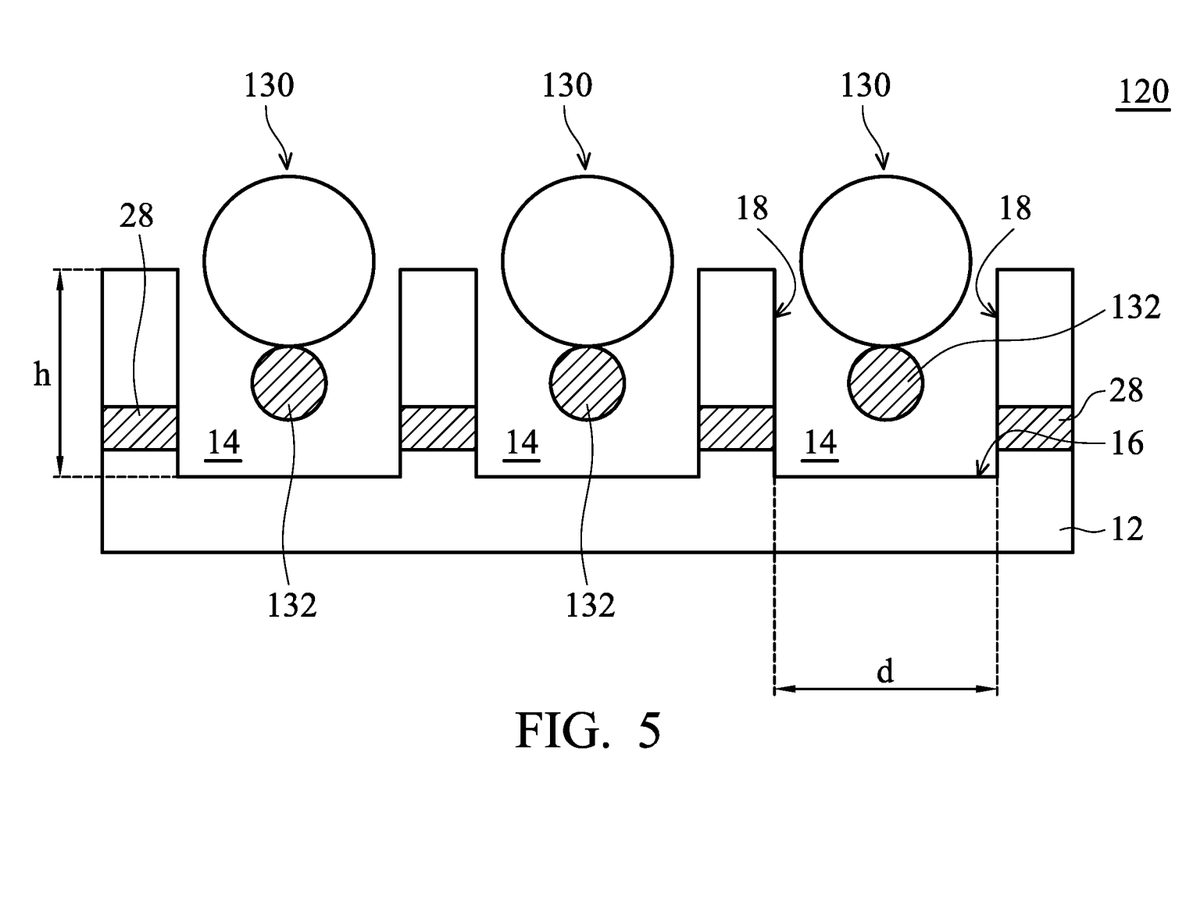
FIG. 5 is a cross-sectional view of an oriented loading system in accordance with one embodiment of the disclosure.
Figure 6:
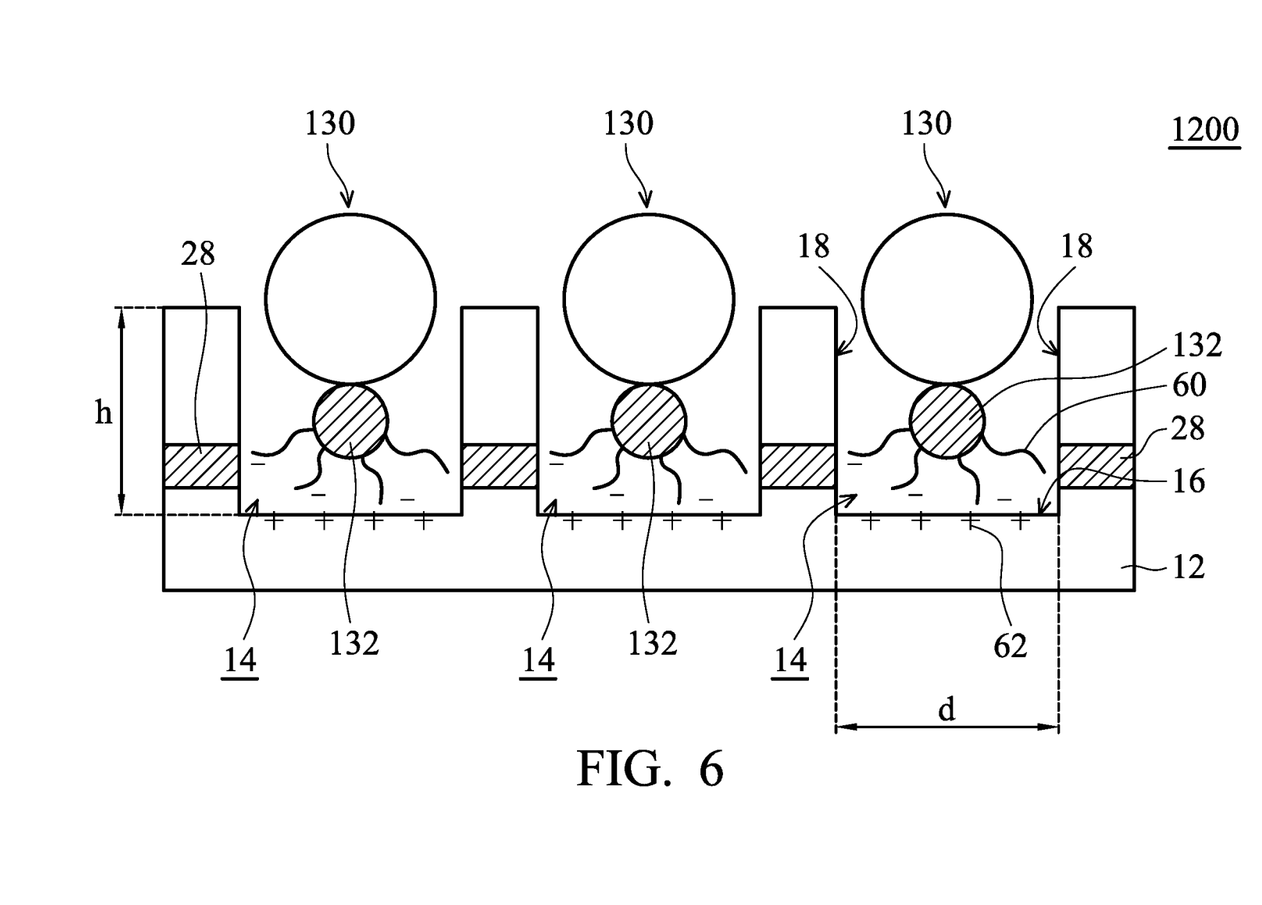
FIG. 6 is a cross-sectional view of an oriented loading system in accordance with one embodiment of the disclosure.

Referring to FIG. 5, in accordance with one embodiment of the disclosure, an oriented loading system 120 is provided. The oriented loading system 120 comprises a substrate 12, a plurality of wells 14 formed in the substrate 12, each well 14 having a bottom 16 and sidewalls 18, a plurality of particles 130 with magnetic beads 132 loaded in the wells 14, and a metal layer 28 comprising magnetic materials such as iron, cobalt, nickel or an alloy thereof deposited partially in the sidewalls 18 of the wells 14 corresponding to the magnetic beads 132. The magnetic bead 132 is attracted by the metal layer 28 such that the magnetic bead 132 is oriented towards the bottom 16 of the well 14. Optionally, the metal layer 28 has the same material as the magnetic bead 132. In this embodiment, the metal layer 28 is deposited in the lower part of the sidewalls 18 such that the magnetic bead 132 is oriented towards the bottom 16 of the well 14. In an alternative embodiment as shown in FIG. 6, the magnetic bead 132 is modified by negatively charged molecules 60 thereon, and the bottom 16 of the wells 14 is modified by positively charged molecules 62 thereon such that the magnetic bead 132 is oriented towards the bottom 16 of the well 14.

In some embodiments, the negatively charged molecules 60 on the magnetic bead 132 may be a target molecule such as polynucleotide or other molecules such as proteins, viruses, bacteria, cells, negatively charged polymers or negatively charged particles.

In some embodiments, the positively charged molecules 62 on the bottom 16 of the wells 14 may comprise a zwitterionic molecule such as cysteine-betaine (CB) silane pI=5-6) through pH modulation (for example pH<pI).

Figure 7:
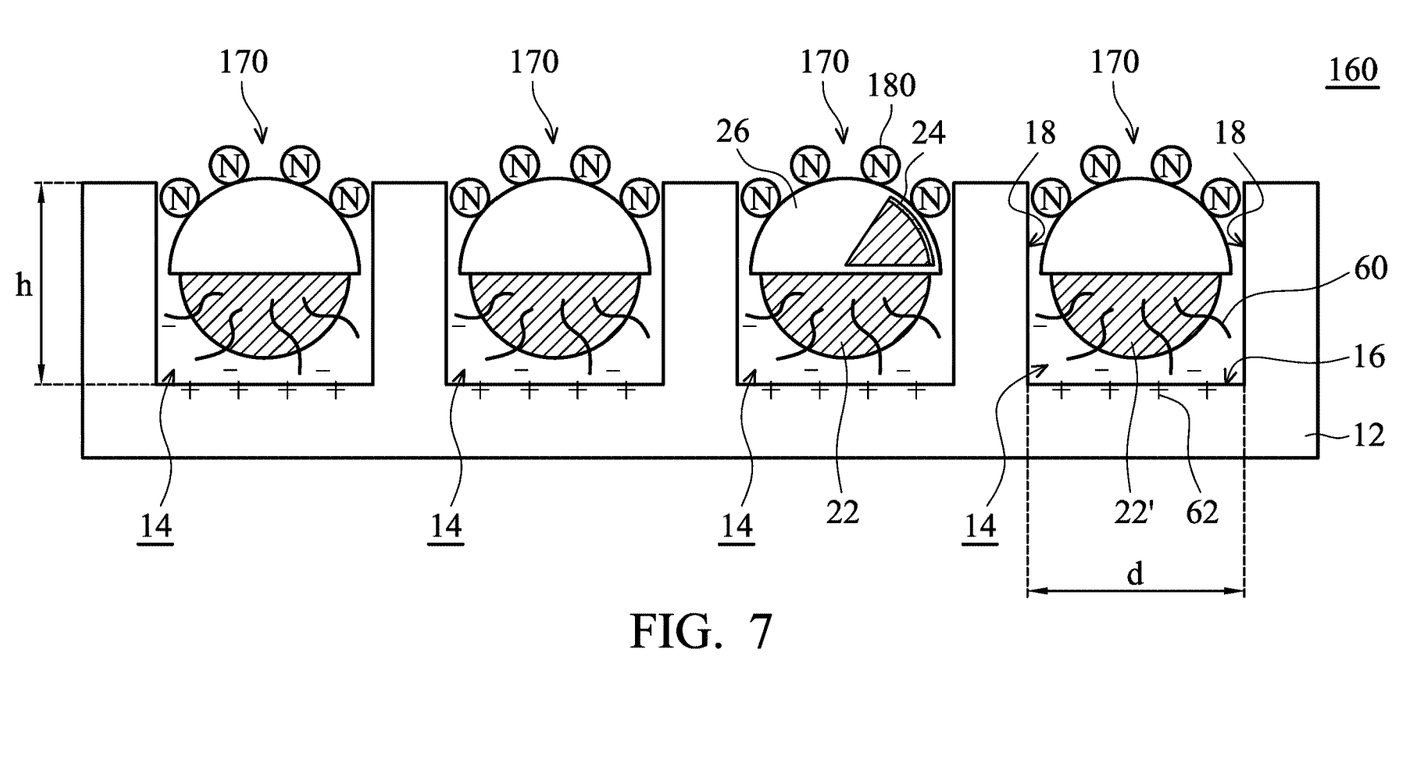
FIG. 7 is a cross-sectional view of an oriented loading system in accordance with one embodiment of the disclosure.
Figure 8:
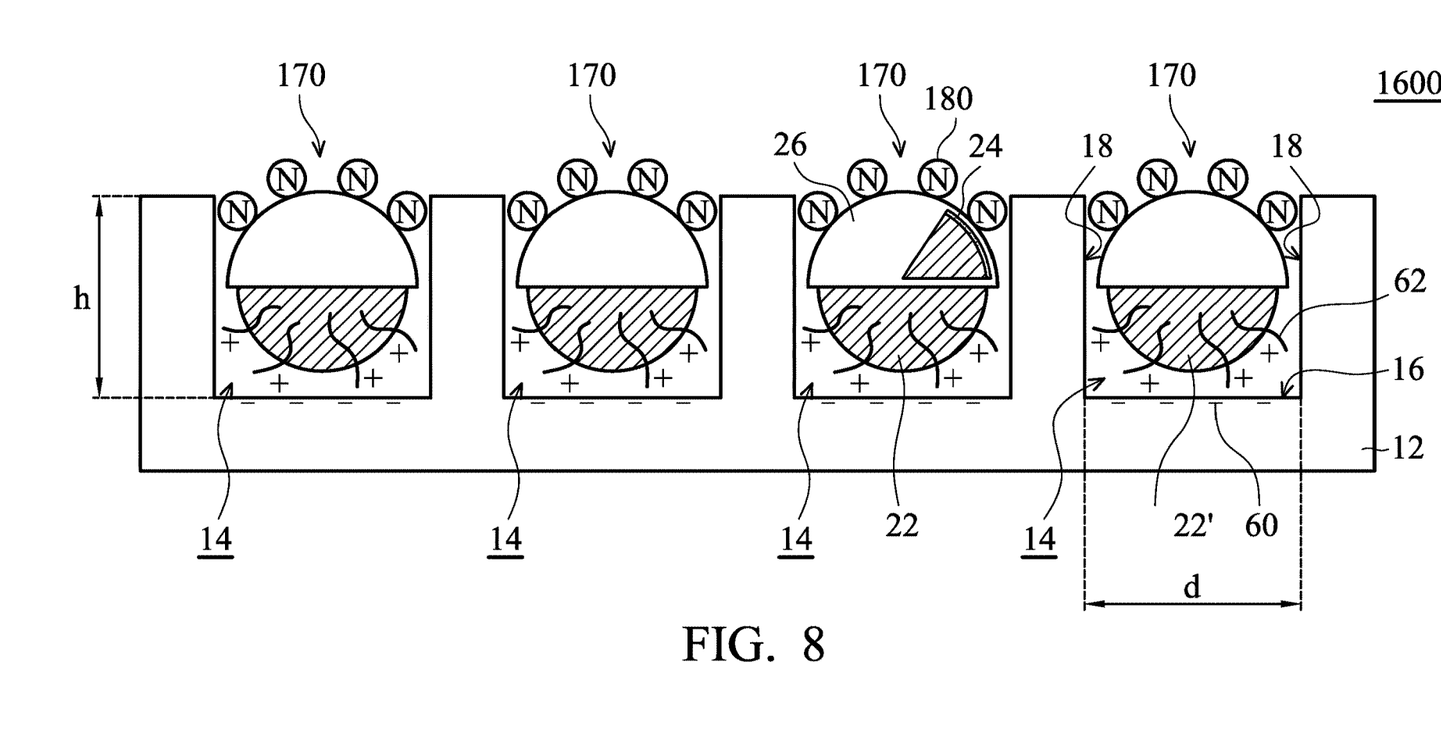
FIG. 8 is a cross-sectional view of an oriented loading system in accordance with one embodiment of the disclosure.

Referring to FIG. 7, in accordance with one embodiment of the disclosure, an oriented loading system 160 is provided. The oriented loading system 160 comprises a substrate 12, a plurality of wells 14 formed in the substrate 12, each well 14 having a bottom 16 and sidewalls 18. The bottom 16 of the wells 14 is modified by positively charged molecules 62 thereon, and a plurality of particles 170 loaded in the wells 14. The particle 170 (e.g. a Janus particle) comprises a core structure 22, an inner layer 24 comprising iron, cobalt, nickel or an alloy thereof (i.e. magnetic material) partially covering the core structure 22 and an outer layer 26 modified by neutrally charged molecules 180 thereon formed over the inner layer 24 such that a part of the core structure 22 uncovered by the inner layer 24 and the outer layer 26 is exposed. The exposed core structure 22' is modified by negatively charged molecules 60 thereon such that the exposed core structure 22' is oriented towards the bottom 16 of the well 14. Alternatively, as shown in FIG. 8, the bottom 16 of the wells 14 is modified by negatively charged molecules 60 thereon, and the exposed core structure 22' is modified by positively charged molecules 62 thereon such that the exposed core structure 22' is oriented towards the bottom 16 of the well 14. The neutrally charged molecules 180 may also be modified on the outer layers or particle surface of the embodiments shown in FIG. 1 to FIG. 6 such that the aggregation between particles are prevented.

In one embodiment, the exposed core structure 22' is modified by negatively charged molecules 60 thereon and the bottom 16 of the wells 14 is modified by zwitterionic molecules. In this embodiment, the pH value of the environment is lower than the pI value of the zwitterionic molecules such that the zwitterionic molecules modified on the bottom 16 of the wells 14 become positively charged molecules 62, as shown in FIG. 7. At present, the negatively charged molecules 60 modified on the exposed core structure 22' are electrostatically attracted by the positively charged molecules 62 modified on the bottom 16 of the wells 14.

In another embodiment, the exposed core structure is modified by negatively charged molecules thereon and the bottom of the wells is modified by zwitterionic molecules. In this embodiment, the pH value of the environment is higher than the pI value of the zwitterionic molecules such that the zwitterionic molecules modified on the bottom of the wells become negatively charged molecules (not shown). At present, the negatively charged molecules modified on the exposed core structure are electrostatically repulsed by the negatively charged molecules modified on the bottom of the wells.

In some embodiments, the neutrally charged molecules 180 may comprise sulfo-betaine (SB) silane pI=2-13).

In some embodiments, the negatively charged molecules 60 may be a target molecule such as polynucleotide or other molecules such as proteins, viruses, bacteria, cells, negatively charged polymers or negatively charged particles.

In some embodiments, the positively charged molecules 62 may comprise a zwitterionic molecule such as cysteine-betaine (CB) silane pI=5-6) through pH modulation (for example pH<pI).

In addition, methods for orienting a particle loaded in a well are provided. In some embodiments, the method comprises the following steps. As shown in FIG. 1, a substrate 12 having a plurality of wells 14 formed therein is provided. In the substrate 12, each well 14 has a bottom 16 and sidewalls 18, and a metal layer 28 comprising magnetic materials such as iron, cobalt, nickel or an alloy thereof is deposited partially in the sidewalls 18 of the wells 14. A plurality of particles 20 (e.g. Janus particles) are provided. The particle 20 comprises a core structure 22, an inner layer 24 comprising magnetic materials such as iron, cobalt, nickel or an alloy thereof partially covering the core structure 22 and an outer layer 26 formed over the inner layer 24 such that a part of the core structure 22 uncovered by the inner layer 24 and the outer layer 26 is exposed. Optionally, the inner layer 24 has the same material as the metal layer 28. The particles 20 are loaded in the wells 14. The inner layer 24 is magnetically attracted by the metal layer 28. In FIG. 1, the metal layer 28 is deposited at an upper portion of the sidewalls 18, preferably above half of the well depth, such that the exposed core structure 22' is oriented towards the bottom 16 of the well 14 due to disposition of the metal layer 28 at the upper portion of the sidewalls 18. Referring to FIG. 2, the metal layer 28 is deposited at a lower portion of the sidewalls 18, preferably below half of the well depth, such that the outer layer 26 is oriented towards the bottom 16 of the well 14 due to disposition of the metal layer 28 at the lower portion of the sidewalls 18.

The above methods may be further enhanced by modifying electrically charged molecules on the bottom of the wells and the outer layer or the exposed core structure. Referring to FIG. 3A, the exposed core structure 22' is modified by negatively charged molecules 60 thereon. The bottom 16 of the wells 14 is modified by positively charged molecules 62 thereon. The particles 20 are loaded in the wells 14. The inner layer 24 is magnetically attracted by the metal layer 28 and the negatively charged molecules 60 modified on the exposed core structure 22' are electrostatically attracted by the positively charged molecules 62 modified on the bottom 16 of the wells 14 such that the exposed core structure 22' is oriented towards the bottom 16 of the well 14. Referring to FIG. 4A, the outer layer 26 is modified by negatively charged molecules 60 thereon. The bottom 16 of the wells 14 is modified by positively charged molecules 62 thereon. The particles 20 are loaded in the wells 14. The inner layer 24 is magnetically attracted by the metal layer 28 and the negatively charged molecules 60 modified on the outer layer 26 are electrostatically attracted by the positively charged molecules 62 modified on the bottom 16 of the wells 14 such that the outer layer 26 is oriented towards the bottom 16 of the well 14.

In FIG. 3A, the bottom 16 of the wells 14 is modified by the positively charged molecules 62 thereon through, for example, pH modulation. For example, the bottom 16 of the wells 14 is modified by zwitterionic molecules. When the pH value of the environment is lower than the pI value of the zwitterionic molecules, the zwitterionic molecules become positively charged.

Methods for controlling the loading of the particles via pH modulation are also provided herein. The method comprises the following steps. As shown in FIG. 7, a substrate 12 having a plurality of wells 14 formed therein is provided. In the substrate 12, each well 14 has a bottom 16 and sidewalls 18. The bottom 16 of the wells 14 is modified by positively charged molecules 62 thereon. A plurality of particles 170 (e.g. Janus particles) is provided. The particle 170 comprises a core structure 22, optionally an inner layer 24 comprising magnetic materials such as iron, cobalt, nickel or an alloy thereof partially covering the core structure 22 and an outer layer 26 modified by neutrally charged molecules 180 thereon formed over the inner layer 24 or directly over the core structure 22 such that a part of the core structure 22 uncovered by the inner layer 24 and the outer layer 26 is exposed. The exposed core structure 22' is modified by negatively charged molecules 60 thereon. The particles 170 are loaded in the wells 14. The negatively charged molecules 60 modified on the exposed core structure 22' are electrostatically attracted by the positively charged molecules 62 modified on the bottom 16 of the wells 14 such that the exposed core structure 22' is oriented towards the bottom 16 of the well 14. Alternatively, as shown in FIG. 8, the bottom 16 of the wells 14 is modified by negatively charged molecules 60 thereon, and the exposed core structure 22' is modified by positively charged molecules 62 thereon. When the particles 170 are loaded in the wells 14, the positively charged molecules 62 modified on the exposed core structure 22' are electrostatically attracted by the negatively charged molecules 60 modified on the bottom 16 of the wells 14 such that the exposed core structure 22' is oriented towards the bottom 16 of the well 14.

Therefore, the bottom 16 of the wells 14 may be modified by the negatively charged molecules 60 or the positively charged molecules 62 thereon through, for example, pH modulation. For example, in one embodiment, the exposed core structure 22' is modified by negatively charged molecules 60 thereon and the bottom 16 of the wells 14 is modified by zwitterionic molecules. In this embodiment, the pH value of the environment is adjusted to be lower than the pI value of the zwitterionic molecules such that the zwitterionic molecules modified on the bottom 16 of the wells 14 become positively charged molecules 62, as shown in FIG. 7. At present, the negatively charged molecules 60 modified on the exposed core structure 22' are electrostatically attracted by the positively charged molecules 62 modified on the bottom 16 of the wells 14. In another embodiment, the exposed core structure is modified by negatively charged molecules thereon and the bottom of the wells is also modified by zwitterionic molecules. In this embodiment, the pH value of the environment is adjusted to be higher than the pI value of the zwitterionic molecules such that the zwitterionic molecules modified on the bottom of the wells become negatively charged molecules (not shown). At present, the negatively charged molecules modified on the exposed core structure are thus electrostatically repulsed by the negatively charged molecules modified on the bottom of the wells, and the particle 170 moves away from the well 14.

In the disclosure, the nanoparticles enhance loading efficiency of target molecules. Signals produced from the target molecules are explicitly detected due to the precise orientation of the nanoparticles during detection. The present disclosure provides the methods and systems for precise nanoparticle orientation via modifying the nanoparticles, the nanowells or combination thereof.

EXAMPLES

Example 1

Synthesis of Cysteine-Betaine (CB) Silane

Scheme:

Trimethoxy[(3-methylamino)propyl]silane and ethyl 4-bromobutanoate were mixed in ACN by the molar ratio of 1:1.3, and then refluxed for 72 hrs. The product was dried by lyophilizer. For the glass surface modification, the $O_2$ plasma (or piranha) treated glass was immersed in the 1 (v/v) % product dissolved in EtOH for 1 hr. Then, the glass grafted with CB functional groups was obtained after the ethyl groups hydrolyzed by treating the 2.5M HCl for 30 min.

Example 2

Synthesis of Sulfo-Betaine (SB) Silane

Scheme:

11-Bromo-undec-1-ene (5 ml) in 50 ml THF was stirred for 8 h at RT. The mix solution was concentrated in vacuo, and added DCM 50 ml concentrated two times, then extracted with NaOH. The organic solution through anhydrous sodium sulfate filter, and concentrated in vacuo to obtain N,N-dimethyl-undec-10-enyl-amine (colorless oil). N,N-Dimethyl(11-mercaptoundecyl)amine (3.0 g) was added to a solution of 1,3-propanesultone (1.6 mL) in anhydrous acetone (100 mL), and the reaction mixture was stirred at RT for 24 h. The reaction mixture was filtered, and the solid was washed with acetone and dried in vacuo to obtain 3-(N,N-dimethyl-undec-10-enyl-amino)-propane-1-sulfonic acid (white solid). Nitrogen gas was bubbled through a solution of $CH_2CH(CH_2)_9N^+(CH_3)_2CH_2CH_2CH_2SO_3^-$ (2.7 g) and $CH_3C(O)SH$ (5.0 mL) in methanol (10 mL), ABCN (50 mg) was added, and the solution was irradiated in a photoreactor at RT for 16 h. Anhydrous acetone (200 mL) was added, and the resulting precipitate was filtered and dried in vacuo. The product was recrystallized from acetone/methanol to obtain $CH_3C(O)S-(CH_2)_{11}N^+(CH_3)_2CH_2CH_2CH_2SO_3^-$ (white solid). Nitrogen gas was bubbled through a solution of $CH_3C(O)S(CH_2)_{11}N^+(CH_3)_2CH_2CH_2CH_2SO_3^-$ (1.0 g) in $H_2O$ (10 mL) for 10 min, NaOH (5 mL, 1.0M) was added, and the solution was stirred for 2 h. The solution was acidified with HCl (6 mL, 1M), filtered into a scintillation vial, frozen, and lyophilized to obtain $HS(CH_2)_{11}N^+(CH_3)_2CH_2CH_2CH_2SO_3^-$ (white solid).

It will be apparent to those skilled in the art that various modifications and variations can be made to the disclosed embodiments. It is intended that the specification and examples be considered as exemplary only, with the true scope of the disclosure being indicated by the following claims and their equivalents.

What is claimed is:
1. An oriented loading system, comprising:
    a substrate;
    a plurality of wells formed in the substrate, each well having a depth, a bottom and sidewalls, the sidewalls having an upper part and a lower part;
    a plurality of particles loaded in the wells, wherein each of the plurality of particles comprises a core structure and an inner layer comprising magnetic material partially covering the core structure, or the inner layer is further covered by an outer layer, wherein a part of the core structure uncovered by the inner layer is exposed or is further covered by a coating layer; and
    a metal layer comprising magnetic material deposited partially in the sidewalls of the wells, wherein the inner layer is attracted by the metal layer such that the exposed core structure or the coating layer, or the inner layer or the outer layer becomes a bottom side of the particle oriented towards the bottom of the well, wherein the bottom side of the particle is modified by an electrically charged molecule, and the bottom of the well is modified by an electrically charged molecule, wherein the electrically charged molecule on the bottom side of the particle comprises opposite charge to the electrically charged molecule on the bottom of the well, wherein when the metal layer is deposited in the upper part of the sidewalls, the exposed core structure or the coating layer which is modified by the electrically charged molecule is oriented towards the bottom of the well, or the inner layer or the outer layer which is modified by the electrically charged molecule is oriented towards the bottom of the well, or when the metal layer is deposited in the lower part of the sidewalls, the inner layer or the outer layer which is modified by the electrically charged molecule is oriented towards the bottom of the well.

2. The oriented loading system as claimed in claim 1, wherein the outer layer and the coating layer comprise non-magnetic material, and the coating layer is different from the outer layer.

3. The oriented loading system as claimed in claim 2, wherein the non-magnetic material is polystyrene, hydrogel, silica, alumina, diamond, or gold, silver, copper or an alloy thereof.

4. The oriented loading system as claimed in claim 1, wherein the core structure comprises polystyrene, hydrogel, silica, alumina, diamond, or gold, silver, copper or an alloy thereof.

5. The oriented loading system as claimed in claim 1, wherein the magnetic material of the inner layer and the magnetic material of the metal layer are independently selected from the group consisting of iron, cobalt, nickel and an alloy thereof.

6. The oriented loading system as claimed in claim 1, wherein the inner layer or the outer layer has a thickness of 5-1,000 nm.

7. The oriented loading system as claimed in claim 1, wherein the particle has a diameter of 50 nm-10 μm.

8. The oriented loading system as claimed in claim 1, wherein the well has a width which is 1-3 times the diameter of the particle.

9. The oriented loading system as claimed in claim 1, wherein the well has a depth which is 0.1-5 times the diameter of the particle.

10. The oriented loading system as claimed in claim 1, wherein the particles further comprise neutrally charged molecules modified thereon.

11. The oriented loading system as claimed in claim 1, wherein the electrically charged molecules on the bottom of the wells comprise a zwitterionic molecule.

* * * * *